United States Patent [19]

Rice

[11] 3,829,569

[45] Aug. 13, 1974

[54] THERAPEUTIC COMPOSITION AND METHOD FOR ITS USE

[75] Inventor: Leonard M. Rice, Baltimore, Md.

[73] Assignee: Tri-Kem Corporation, Washington, D.C.

[22] Filed: Oct. 27, 1967

[21] Appl. No.: 678,502

[52] U.S. Cl. ............................................. 424/232
[51] Int. Cl. .............................................. A61k 27/00
[58] Field of Search . 167/654 Q, 55 DETOK, 55 A, 167/65 N; 424/232, 233, 234

[56] References Cited
UNITED STATES PATENTS

| | | | |
|---|---|---|---|
| 462,990 | 11/1891 | Oppenheimer | 167/83 |
| 691,687 | 1/1902 | Wilson | 167/83 |
| 2,340,037 | 1/1944 | Zipper | 167/83 |

OTHER PUBLICATIONS

U.S. Dispensatory, 25th Ed., Lippincott, 1955, pages 15–17, 56–59, 773–774, 779–781, 890–895, 1,015–1,016, 1,416, 1,524.
Facts and Comparisons, April 1965, pages 244–249.
American Drug Index, 1965 Ed., pages 24–29, 138–139.
Fishbein, "Handbook of Therapy," 1957, pages 703–704.
Stevens, "The Practice of Medicine," 1924, pages 322–325.
Sollman, "A Manual of Pharmacology," 8th Ed., 1957, pages 38–39.
Trulson et al., "Vitamin Medication in Alcoholism," V.A.M.A., 5/8/54, pages 114–115.
Lecoq, "Medications Nouvelles Utilisees Dans La Lutte Contre L'Alcoulisme," "Produits Pharmaceuthques," 9/1953, pages 461–471.

Primary Examiner—Stanley J. Friedman
Attorney, Agent, or Firm—Lane, Aitken, Dunner & Ziems

[57] ABSTRACT

A therapeutic composition for combatting all of the major symptoms resulting from the overindulgence of alcoholic beverages comprising a two-part formulation one part of which contains aspirin and aluminum hydroxide and the other part of which contains magnesium carbonate, magnesium trisilicate, nicotinamide, thiamine hydrochloride and peppermint oil and either or both of which contain caffeine. A method for using said composition.

4 Claims, No Drawings

THERAPEUTIC COMPOSITION AND METHOD FOR ITS USE

The present invention relates to a therapeutic composition of matter and more particularly to a composition designed specifically to combat all of the major symptoms associated with aftereffects due to the overindulgence of alcoholic beverages.

The major symptoms due to overindulgence of alcoholic beverages include several or all of the following: headache, nervousness, "butterflies" in the stomach, nausea, depression, lethargy and general malaise. These symptoms are essentially all derived from central nervous system disturbances caused by the excessive alcohol intake and generally allied loss of sleep and dissipation.

In the past, these symptoms have been treated by various techniques, usually by means of preparations for partial relief of the symptoms. To applicant's knowledge, however, no formulation has been suggested or is available for the combined relief of all of the distressing symptoms associated with the aftereffects of overindulgence of alcoholic beverages.

It is, accordingly, the primary purpose of the present invention to provide a scientifically balanced composition for the effective treatment of all of the major distressing symptoms associated with the aftereffects of overindulgence of alcoholic beverages.

It is another important purpose of the present invention to provide a novel and scientifically balanced composition containing an analgesic, a mild stomachic, an antiacid, a mild anesthetic, a general systemic and an anti-depressant.

These and further objects and advantages of the present invention will become more apparent upon reference to the ensuing description and appended claims.

The composition of the present invention contains six essential ingredients: (1) an analgesic; (2) an antidepressant; (3) a mild stomachic; (4) a mild anesthetic; (5) a general metabolic systemic; and (6) an antiacid.

The purpose of the analgesic is, in general to combat headache and general malaise; that of the antidepressant to overcome depression; that of the stomachic to combat nausea; that of the anesthetic to reduce irritability of the stomach lining; that of the general systemic to provide a general systemic metabolic effect and to combat malaise and depression; and that of the antiacid to combat nausea.

A formulation which provides the foregoing effects and which has been found to produce outstanding results in relieving the aftereffects of overindulgence of alcoholic beverages is set forth in Example I:

Example I

| Substance | Purpose | Amount in Parts By Weight±10% |
|---|---|---|
| Capsule No. 1 | | |
| Aspirin | Analgesic | 414 |
| Aluminum Hydroxide | Antiacid | 130 |
| Capsule No. 2 | | |
| Acetaminophen | Analgesic | 325 |
| Magnesium Trisilicate | Antiacid | 65 |
| Magnesium Carbonate | Antiacid | 65 |
| Nicotinamide | General Metabolic Systemic | 12.5 |
| Thiamine Hydrochloride | General Metabolic Systemic | 5 |

Example I-Continued

| Substance | Purpose | Amount in Parts By Weight±10% |
|---|---|---|
| Refined Peppermint Oil | Mild Anesthetic & Stomachic | 55 |

In addition, the formulation also includes caffeine (serving as an anti-depressant, or stimulant) in an amount in parts by weight of about 195±10 percent. The caffeine may be included in either capsule or may, if desired, be divided between both. An effective formulation is one which includes about 65 parts be weight (±10 percent) in the first capsule and about 130 parts by weight (±10 percent) in the second.

The particular formulation set forth above is critical with respect to all of the ingredients and quantities recited (with the permissible deviation indicated above). Any deviation of the recited ingredients in excess of about 10 percent by weight of the quantities indicated (and preferably no greater than about 5 percent) will result in the production of an inferior product. More specifically, the specific ingredients and the quantities recited above were selected only after extensive experimentation and the preparation of countless formulations in an attempt to prepare a composition providing maximum therapeutic benefit while, at the same time, providing a minimum of side effects. Any significant deviation beyond the quantities indicated above destroys the balance which is provided by the present formulation.

As will be noted, the composition of the present invention is divided into two separate portions. This division of the essential ingredients of such composition is significant for two reasons. The first is a practical consideration relating to the fact that the necessary quantities of ingredients required to produce the required results in relieving the aftereffects of overindulgence of alcoholic beverages are ordinarily too large to permit the composition to be taken as such in a single dose. To avoid this problem, the formulation was necessarily divided into a plurality of doses. A second and more significant difficulty which the division of the essential ingredients into two portions obviates in that related to the stability of the formulation. Thus, the shelf-life of the composition of the present invention is excellent in that it has been found to be stable for at least 18 months when divided as set forth above. Experimentation has demonstrated, on the other hand, that any deviation from the foregoing arrangement results in a product with a shortened shelf-life.

In the preparation of the foregoing formulation, the materials to be placed in the first capsule are prepared by mixing a special coated aspirin (this aspirin is crystal coated to protect it from hydration and is sold by the Monsanto Chemical Company) with the aluminum hydroxide (and caffeine, if present in this capsule), the aluminum hydroxide being in the form of a gel. This material is mixed uniformly with a small quantity of calcium stearate (which is used as a lubricant and which does not form an essential part of the inventive subject matter) and then slugged out and ground into a powder. It is then packed into the first capsule. The remaining ingredients are then mixed together, ground to a powder and placed in the second capsule. The result is two capsules each having approximately the same weight and distribution of ingredients and designed to be taken together as a single dose.

While the composition of the present invention is extremely effective in combatting all of the major aftereffects arising from overindulgence of alcoholic beverages when taken on a moderate level, it is to be understood that the present invention is not designed to cure or treat alcoholism and its symptoms arising from excessive and habitual intake of alcoholic beverages.

What is claimed is:

1. A therapeutic composition of matter containing the following ingredients present in the recited approximate parts by weight:

| Ingredient | Parts by Weight ± 10% By Weight |
| --- | --- |
| Aspirin | 414 |
| Aluminum Hydroxide | 130 |
| Acetaminophen | 325 |
| Magnesium Carbonate | 65 |
| Magnesium Trisilicate | 65 |
| Nicotinamide | 12.5 |
| Thiamine Hydrochloride | 5 |
| Peppermint Oil | 55 |
| Caffeine | 195 | said composition being divided into two separate portions, the first portion containing the recited amounts of aspirin and aluminum hydroxide, the second portion containing the recited amounts of acetaminophen, magnesium carbonate, magnesium trisilicate, nicotinamide, thiamine hydrochloride and peppermint oil, the caffeine being present in said first and/or second portions.

2. A therapeutic composition of matter as defined in claim 1 wherein the permissible deviation of ingredients from the quantities recited is about ±5 percent by weight.

3. A therapeutic composition of matter as defined in claim 1 wherein about 65 parts by weight ± about 10 percent of caffeine is present in said first portion and about 130 parts by weight of caffeine ± about 10 percent is present in said second portion.

4. A therapeutic composition of matter as defined in claim 1 wherein said aluminum hydroxide is a gel.

* * * * *